(12) United States Patent
De Leon et al.

(10) Patent No.: US 12,372,040 B2
(45) Date of Patent: Jul. 29, 2025

(54) INTERNAL COMBUSTION ENGINE SYSTEM

(71) Applicant: Volvo Truck Corporation, Gothenburg (SE)

(72) Inventors: Aurora De Leon, Gothenburg (SE); Karsten Rohrssen, Gråbo (SE)

(73) Assignee: Volvo Truck Corporation, Gothenburg (SE)

(*) Notice: Subject to any disclaimer, the term of this patent is extended or adjusted under 35 U.S.C. 154(b) by 0 days.

(21) Appl. No.: 18/954,122

(22) Filed: Nov. 20, 2024

(65) Prior Publication Data

US 2025/0198358 A1    Jun. 19, 2025

(51) Int. Cl.
*F02D 9/06* (2006.01)
*F02D 13/04* (2006.01)
*F02D 41/14* (2006.01)

(52) U.S. Cl.
CPC ......... *F02D 41/1448* (2013.01); *F02D 13/04* (2013.01); *F01N 2240/36* (2013.01); *F02D 2250/34* (2013.01); *F02D 2700/0253* (2013.01)

(58) Field of Classification Search
CPC ............. F01N 2240/36; F02D 41/1448; F02D 2250/34; F02D 2700/0253; F02D 2700/0256
See application file for complete search history.

(56) References Cited

U.S. PATENT DOCUMENTS

| | | | |
|---|---|---|---|
| 6,510,397 B1 | 1/2003 | Choe et al. | |
| 6,732,522 B2 | 5/2004 | Wright et al. | |
| 7,593,828 B2 | 9/2009 | Wang et al. | |
| 10,047,666 B2 * | 8/2018 | Yamashita | F02B 37/14 |
| 10,590,862 B2 | 3/2020 | Fesl et al. | |

(Continued)

FOREIGN PATENT DOCUMENTS

| | | |
|---|---|---|
| DE | 102015107803 A1 | 12/2015 |
| EP | 2341236 A1 | 7/2011 |
| EP | 4279729 A1 | 11/2023 |

OTHER PUBLICATIONS

Extended European Search Report, European Patent Application No. 23217238.7, mailed Jun. 12, 2024.

*Primary Examiner* — Jonathan R Matthias
(74) *Attorney, Agent, or Firm* — Sage Patent Group

(57) ABSTRACT

The present disclosure relates to an internal combustion engine (ICE) system comprising: an internal combustion engine; a turbocharger arrangement, the turbocharger arrangement having a turbine arranged in an exhaust gas conduit, the exhaust gas conduit extending between the internal combustion engine and the turbine, and further a compressor disposed in an inlet manifold, the inlet manifold extending between the compressor and the internal combustion engine; a controllable backpressure valve being located in the exhaust gas conduit, the controllable backpressure valve being configured to control the pressure within the exhaust gas conduit; a pressure sensor disposed in the exhaust gas conduit, and further in-between the controllable backpressure valve and the turbine, the pressure sensor being configured to measure an exhaust gas pressure downstream the controllable backpressure valve; a speed sensor configured to measure a compressor speed; and a control system for determining an operational status of the pressure sensor.

14 Claims, 5 Drawing Sheets

(56) References Cited

U.S. PATENT DOCUMENTS

| | | | |
|---|---|---|---|
| 2001/0017033 A1* | 8/2001 | McKinley | F02M 26/05 60/605.2 |
| 2010/0082298 A1 | 4/2010 | Kurokawa et al. | |
| 2013/0080034 A1 | 3/2013 | Chi et al. | |
| 2023/0384183 A1* | 11/2023 | Worms | F02B 37/24 |

* cited by examiner

INTERNAL COMBUSTION ENGINE SYSTEM

CROSS REFERENCE TO RELATED APPLICATIONS

This application claims priority to European Patent Application No. 23217238.7, filed on Dec. 15, 2023, the disclosure and content of which is incorporated by reference herein in its entirety.

TECHNICAL FIELD

The disclosure relates generally to an internal combustion engine system and a method for operating an internal combustion engine system. The disclosure can be applied to heavy-duty vehicles, such as trucks, buses, and construction equipment, among other vehicle types. Although the disclosure may be described with respect to a truck, the disclosure is not restricted to any particular vehicle.

BACKGROUND

For an internal combustion engine (ICE) system, it may be desired to control the exhaust gases leaving the internal combustion engine. For instance, it may be desired to control the exhaust gases such that an exhaust aftertreatment system connected to, or forming part of, the internal combustion engine system operates under desired conditions.

In connection with controlling the flow of exhaust gases through the ICE system, it may be desirable to monitor various operating parameters by one or more sensors, such as pressure sensors. However, such sensors are expensive and could potentially also malfunction for various reasons. There is thus a desire to provide an improved system and method for diagnosing sensors in an ICE system of a vehicle.

SUMMARY

According to a first aspect of the disclosure, there is provided an internal combustion engine (ICE) system. The ICE system comprise an internal combustion engine; a turbocharger arrangement, the turbocharger arrangement having a turbine arranged in an exhaust gas conduit, the exhaust gas conduit extending between the internal combustion engine and the turbine, and further a compressor disposed in an inlet manifold, the inlet manifold extending between the compressor and the internal combustion engine, the compressor being configured to be connected to the turbine via a shaft; a controllable backpressure valve being located in the exhaust gas conduit, the controllable backpressure valve being configured to control the pressure within the exhaust gas conduit; a pressure sensor disposed in the exhaust gas conduit, and further in-between the controllable backpressure valve and the turbine, the pressure sensor being configured to measure an exhaust gas pressure downstream the controllable backpressure valve; a speed sensor configured to measure a compressor speed; a control system for determining an operational status of the pressure sensor. Moreover, the control system comprises processing circuitry configured to: receive speed data from the speed sensor so as to determine a compressor speed; determine a pressure ratio over the compressor; determine a pressure drop over the compressor based on the determined compressor speed and the determined pressure ratio over the compressor; determine a first reference exhaust gas pressure at a position in-between the controllable backpressure valve and the turbine based on the determined pressure drop over the compressor; determine a second reference exhaust gas pressure using the pressure sensor; compare the determined first reference exhaust gas pressure with the determined second reference exhaust gas pressure; and determine that the pressure sensor is operational based on the comparison.

The first aspect of the disclosure may seek to improve the reliability of diagnosing a pressure sensor positioned in an exhaust gas conduit downstream of an engine, particularly in ICE systems featuring a controllable backpressure valve disposed in the exhaust gas conduit. Moreover, the present disclosure may provide an improved method and system of diagnosing a pressure sensor during an active ICE system operation such as during engine brake or when the ICE system is operating in a heat mode. A technical benefit may include an increased accuracy in diagnosing one or more pressure sensors arranged in an exhaust gas conduit of an ICE system.

More specifically, by using the compressor speed to determine the pressure ratio over the compressor and determining the pressure drop over the compressor to determine the exhaust gas pressure downstream the controllable backpressure valve, there is generally no need for receiving information about the position of the controllable backpressure valve in order to determine the exhaust gas pressure. In this manner, the proposed system and method allows for diagnosing the pressure sensor in the exhaust gas conduit during the activation of an engine brake operation or when the ICE is in a heat mode. Therefore, an error of the sensor can be detected during an engine operation when a potential error of the pressure reading may have the most negative impact on the control of the ICE system, i.e. the pressure sensor is used for controlling the controllable backpressure valve and exhaust pressure, and thus also for controlling the engine brake operation.

The internal combustion engine may generally be a diesel ICE engine, but other examples are also possible, such as hydrogen ICE, LNG ICE or CNG ICE. The ICE may comprise any number of cylinders. For example the ICE may comprise four, six, or eight cylinders.

In some examples, the processing circuitry may further be configured to determine that the pressure sensor is operational if the determined second reference exhaust gas pressure equals the determined first reference exhaust gas pressure. A technical benefit may include allowing to determine whether or not the sensor is sufficient operable. A technical benefit may include an even more increased accuracy in diagnosing the pressure sensor.

In some examples, the processing circuitry may further be configured to determine that the pressure sensor is non-operational if the determined second reference exhaust gas pressure is different than the determined first reference exhaust gas pressure. A technical benefit may include an even more increased accuracy in diagnosing the pressure sensor.

In some examples, the pressure sensor may be a first pressure sensor, and the ICE system may further comprise a second pressure sensor disposed in the exhaust gas conduit in-between the ICE and the controllable backpressure valve, the second pressure sensor being configured to measure an exhaust gas pressure upstream the controllable backpressure valve, and wherein the processing circuitry may further be configured to control the controllable backpressure valve to an open state; and determine that the second pressure sensor is operational by comparing the determined first reference exhaust gas pressure with a measured exhaust gas pressure using the second pressure sensor. A technical benefit of using two pressure sensors for controlling the controllable backpressure valve may include providing an even more accurate and smooth control of the controllable backpressure valve. In addition, when needed, it provides an even better diagnostic process for the controllable backpressure valve.

In some examples, the processing circuitry is further configured to determine the operational status of the pressure sensor during an engine braking operation of the internal combustion engine system. A technical benefit may include an improved diagnose of the sensor during engine braking. A benefit of performing a diagnose of the pressure sensor during engine brake is to avoid building up high peak cylinder pressure that could damage the engine, if the pressure becomes too high.

In some examples, the processing circuitry is further configured to determine the operational status of the pressure sensor during a heat mode operation of the internal combustion engine system. A technical benefit of diagnosing during heat mode is to avoid exceeding exhaust temperature limits that could damage the EATS system.

In some examples, the ICE is a four-stroke engine. The ICE may comprise a piston adapted to move in the cylinder during an intake stroke ending at a bottom dead center at a bottom dead center crank angle for the piston.

In some examples, the controllable backpressure valve may comprise a pivotable flap, such as a continuously pivotable flap, pivotable between an open condition and an end condition, preferably the end condition resulting in that a portion of an exhaust guide assembly is fully closed. The pivotable flap may comprise a butterfly valve. A technical benefit may include that the backpressure valve allows for an appropriate control of the exhaust gas flow.

In some examples, the turbo comprises a plurality of guide vanes that are adapted to move so as to control the throttling of the exhaust gas. Purely by way of example, the plurality of guide vanes may be pivoted such that a size of a gap between two adjacent guide vanes is adjusted. A technical benefit may include controlling the pressure of the flow through the turbine.

According to a second aspect of the disclosure, there is provided a vehicle comprising an internal combustion engine system according to the first aspect.

According to a third aspect, there is provided a method of determining an operational status of a pressure sensor disposed in an exhaust gas conduit of an internal combustion engine system, the internal combustion engine system comprising: a controllable backpressure valve being located in the exhaust gas conduit, the exhaust gas conduit extending between an internal combustion engine and a turbine of a turbocharger arrangement, the controllable backpressure valve being configured to control the pressure within the exhaust gas conduit; a compressor disposed in an inlet manifold, the inlet manifold extending between the compressor and the internal combustion engine, the compressor being configured to be connected to the turbine via a shaft; a pressure sensor disposed in the exhaust gas conduit in-between the controllable backpressure valve and the turbine, the pressure sensor being configured to measure an exhaust gas pressure downstream the controllable backpressure valve; a speed sensor configured to measure a compressor speed; wherein the method comprises: receiving speed data from the speed sensor so as to determine a compressor speed; determining a pressure ratio over the compressor; determining a pressure drop over the compressor based on the determined compressor speed and the determined pressure ratio over the compressor; determining a first reference exhaust gas pressure at a position in-between the controllable backpressure valve and the turbine based on the determined pressure drop over the compressor; determining a second reference exhaust gas pressure using the pressure sensor; comparing the determined first reference exhaust gas pressure with the determined second reference exhaust gas pressure; and determining that the pressure sensor is operational based on the comparison.

The third aspect of the present disclosure may seek to improve the reliability of diagnosing a pressure sensor positioned in an exhaust gas conduit downstream of an engine, particularly in ICE systems featuring a controllable backpressure valve disposed in the exhaust gas conduit. Moreover, the present disclosure may provide an improved method and system of diagnosing a pressure sensor during an active ICE system operation such as during engine brake or when the ICE system is operating in a heat mode. A technical benefit may include an increased accuracy in diagnosing one or more pressure sensors arranged in an exhaust gas conduit of an ICE system.

In some examples, the method may further comprise determining that the pressure sensor is operational if the determined second reference exhaust gas pressure equals the determined first reference exhaust gas pressure. A technical benefit may include an even more increased accuracy in diagnosing the pressure sensor.

In some examples, the method may further comprise determining that the pressure sensor is non-operational if the determined second reference exhaust gas pressure is different than the determined first reference exhaust gas pressure. A technical benefit may include an even more increased accuracy in diagnosing the pressure sensor.

In some examples, the pressure sensor may be is a first pressure sensor, and the ICE system further comprises a second pressure sensor disposed in the exhaust gas conduit in-between the internal combustion engine and the controllable backpressure valve, the second pressure sensor being configured to measure an exhaust gas pressure upstream the controllable backpressure valve, and wherein the method further comprises: controlling the controllable backpressure valve to an open state; and determining that the second pressure sensor is operational by comparing the determined first reference exhaust gas pressure with a measured exhaust gas pressure using the second pressure sensor.

In some examples, the method may be performed during an engine braking operation of the internal combustion engine system.

In some examples, the method may be performed during a heat mode operation of the internal combustion engine system.

According to a fourth aspect, there is provided a computer program product comprising program code for performing, when executed by the processing circuitry of the first aspect, the method of the third aspect.

According to a fifth aspect, there is provided a non-transitory computer-readable storage medium comprising instructions, which when executed by the processing circuitry of the first aspect, cause the processing circuitry to perform the method of the third aspect.

The disclosed aspects, examples, and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

Figure 1:
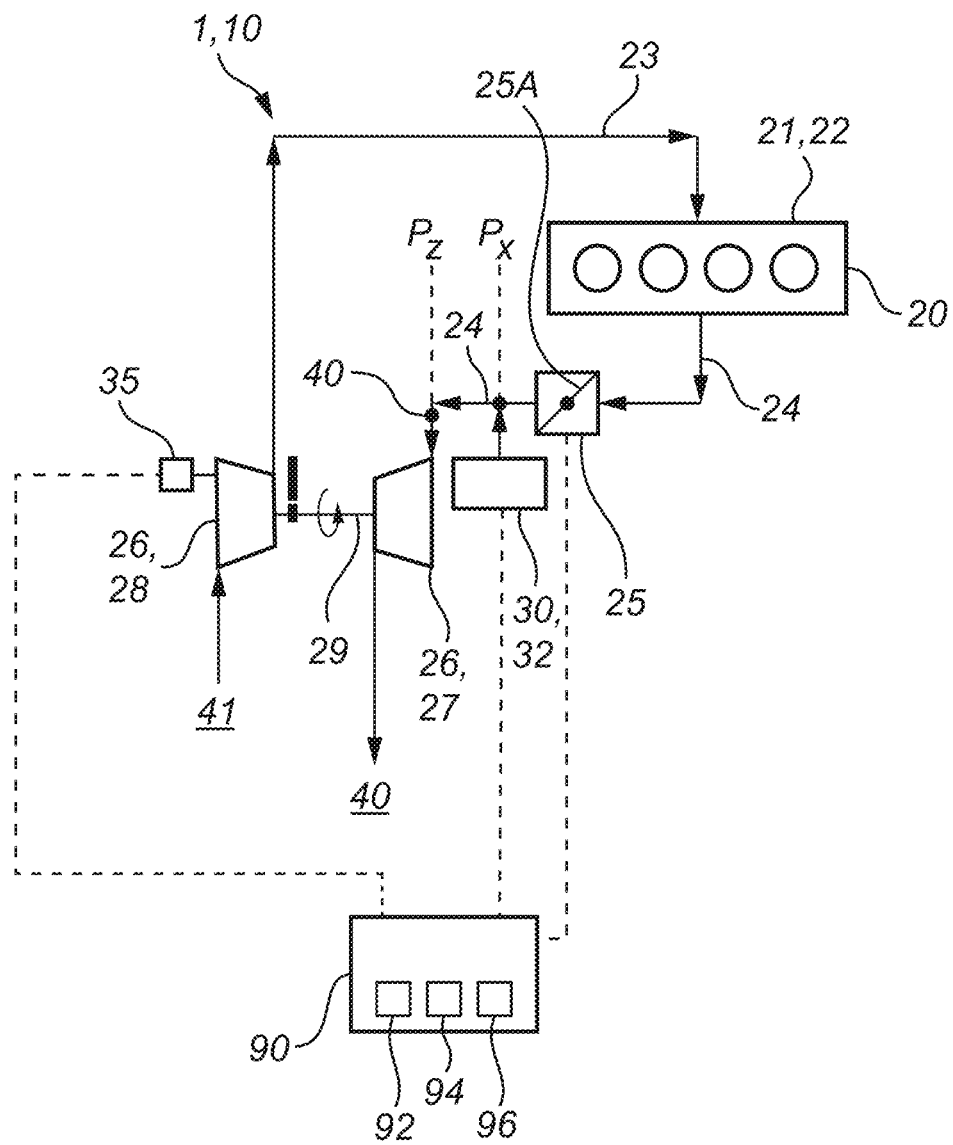
FIG. 1 schematically illustrates an exemplary view of a vehicle comprising an internal combustion engine system according to an example.

The detailed description set forth below provides information and examples of the disclosed technology with sufficient detail to enable those skilled in the art to practice the disclosure.

For an internal combustion engine (ICE) system, it may be desired to control the flow of exhaust gases leaving the ICE. For instance, it may be desired to control the exhaust gases such that an exhaust aftertreatment system connected to, or forming part of, the ICE system operates under desired conditions. In connection with controlling exhaust gases leaving the ICE it may also be a desire to measure and monitor various pressures in the exhaust gas conduit in-between the ICE and the exhaust aftertreatment system. Exhaust gas pressure may e.g. be one parameter affecting the operation of the exhaust aftertreatment system. Moreover, to comply with increasingly stringent emission standards, ICE systems are generally also equipped with a combination of valves and sensors positioned in the exhaust gas conduit to monitor and regulate the flow of the exhaust gases.

However, diagnosing the health and functionality of these sensors may be a challenge, especially in ICE systems where an exhaust valve is incorporated into the exhaust gas conduit. The presence of an exhaust valve introduces additional complexities, as it can impact the exhaust gas flow dynamics and sensor readings. A controllable backpressure valve is one example of an exhaust valve used in the exhaust gas conduit.

Furthermore, the continuous exposure of sensors to high temperatures, corrosive gases, and other harsh operating conditions can lead to sensor degradation and malfunction over time. The location of the pressure sensor can lead to having clogged pipes that could also impact the performance of the sensor.

In ICE systems with a controllable backpressure valve, the accurate diagnosis of sensor(s) becomes even more critical due to the dynamic nature of exhaust gas flow control. Traditional diagnostic methods may fall short in providing accurate and timely assessments of sensor health in such environments. Also, it has been observed that there is a challenge of using traditional diagnostics methods during an active operation of the controllable backpressure valve as an exhaust valve.

Therefore, the present disclosure may seek to improve the reliability of diagnosing a pressure sensor positioned in an exhaust gas conduit downstream of an engine, particularly in ICE systems featuring a controllable backpressure valve disposed in the exhaust gas conduit. Moreover, the present disclosure may provide an improved method and system of diagnosing a pressure sensor during an active ICE system operation such as during engine braking or when the ICE system is operating in a heat mode.

A technical benefit may include an increased accuracy in diagnosing one or more pressure sensors arranged in an exhaust gas conduit of an ICE system.

More specifically, the proposed system and method may be used to observe and diagnose one or more pressure sensors located in the exhaust gas conduit, such as an exhaust manifold of an ICE system during an engine braking mode or a heat mode. By way of example, when a heavy-duty vehicle is running downhill the ICE may be used as a brake to preserve the normal brake system from overload. To control the engine brake power, the exhaust gas conduit may include an exhaust valve, such as a controllable backpressure valve, which is controlled to throttle the exhaust gas flow to produce backpressure.

Optionally, although not strictly required, the ICE system may include two pressure sensors so as to further improve the control of the backpressure valve.

The vehicle may be any type of vehicle suitable for transporting goods, such as bulk material from one location to another. For example, the vehicle may be a heavy-duty vehicle, an excavator, loader, articulated hauler, dump truck, truck or any other suitable vehicle known in the art. In some embodiments, the vehicle may be driven by an operator. In other embodiments, the vehicle may be an autonomous vehicle that is controlled by a vehicle motion management (VMM) unit configured to individually control vehicle units and/or vehicle axles and/or wheels of the vehicle. The vehicle may in other examples be a car, bus, industrial vehicle, boat, ship, etc., wherein motive power may be derived from the ICE. For ease of reference, the following description refers to vehicles in the form of heavy-duty vehicles, such as trucks.

One example of a vehicle 1 will now be described in relation to FIG. 1. The vehicle 1 comprises an internal combustion engine system 10. The internal combustion engine system will generally be referred to as the ICE system 10 for ease of reference.

The ICE system 10 comprises an internal combustion engine, ICE, 20. The ICE 20 is here a diesel ICE. However, the ICE 20 may likewise be operated on another type of fuel, such as natural gas, hydrogen gas, petrol etc. The ICE 20 comprises a cylinder 21. By way of example, the ICE 20 comprises six cylinders 21, however the ICE 20 may comprise any number of cylinders 21, for example four, six, or eight cylinders 21. The ICE 20 also comprises a piston 22 adapted to move in a corresponding cylinder 21. Hence, the ICE 20 comprises a set of cylinders 21 and a set of corresponding pistons 22, wherein a corresponding piston is arranged in a corresponding cylinder.

The ICE 20 is here a four-stroke engine. Each one of the pistons 22 is adapted to move in a corresponding cylinder 21 during an intake stroke (IS) ending at a bottom dead center (BDC), at a bottom dead center crank angle for the piston 22.

As illustrated in FIG. 1, the ICE system 10 further comprises an inlet manifold 23. The inlet manifold 23 is configured to guide air to the ICE 20. The inlet manifold 23 is here an air inlet manifold arranged to guide air to the ICE 20. More specifically, the inlet manifold 23 is arranged to guide air to the cylinder(s) 21 of the ICE 20.

The inlet manifold 23 is configured to be connected to an intake duct 41 for receiving fresh air from the outside, as illustrated in FIG. 1.

Although not illustrated, the ICE system 10 here further comprises at least one inlet valve adapted to selectively provide a fluid communication between the air inlet manifold 23 and the cylinder(s) 21. Each inlet valve may selectively provide a fluid communication between the air inlet manifold 23 and a single cylinder 21. Alternatively, multiple inlet valves may be used to provide a fluid communication between the air inlet manifold 23 and a single cylinder 21. Although not illustrated, the ICE system 10 may further comprise an inlet valve actuation assembly for actuating the at least one inlet valve. The inlet valve actuation assembly is adapted to actuate the at least one inlet valve e.g. during a combustion cycle of the internal combustion engine.

Turning again to FIG. 1 the ICE system 10 comprises an exhaust gas conduit 24. The exhaust gas conduit 24 is configured to exhaust gas from the ICE 20 to an exhaust duct 40. More specifically, the exhaust gas conduit 24 is configured to exhaust gas from the cylinder(s) 21 of the ICE 20 to the exhaust duct 40.

Although not illustrated, the vehicle 1 may further comprise an exhaust aftertreatment system. As a non-limiting example, the exhaust aftertreatment system may comprise a catalyst (not shown) and/or a particle filter (not shown). Purely by way of example, the exhaust aftertreatment system may form part of the ICE system 10 and this applies to any example of the ICE system 10 of the present disclosure. Performance of exhaust aftertreatment systems may be dependent on temperature. As such, the disclosure may be aimed at controlling the ICE system 10 such that a sufficiently high exhaust aftertreatment system temperature may be achieved. Achieving the necessary temperature may be necessary for example at cold start, at low ambient temperatures, and at low engine loads. The exhaust aftertreatment system may e.g. be arranged in the exhaust gas conduit 24, or be an integral part of the exhaust gas conduit 24 and/or exhaust duct 40.

Moreover, the ICE system 10 comprises a turbocharger arrangement 26 comprising a turbine 27 in fluid communication with the ICE 20. More specifically, the turbine 27 is configured to be in fluid communication with the cylinder(s) 21, as is commonly known in the art. The turbine 27 generally comprises a turbine wheel. The turbine 27 is disposed in the exhaust gas conduit 24.

As such, the exhaust gas conduit 24 extends at least between the ICE 20 and the turbine 27 of the turbocharger arrangement 26.

When the ICE system 20 comprises an exhaust aftertreatment system, the turbine 27 is arranged upstream the exhaust aftertreatment system. As such, the exhaust aftertreatment system is arranged in-between the turbine 27 and the exhaust duct 40.

The turbine may be a conventional turbine used in an ICE system of a heavy-duty vehicle. The turbine may in some examples be a variable geometry turbine. Such type of turbine comprises a plurality of guide vanes that are adapted to move so as to control the throttling of the exhaust gas.

Moreover, the ICE system 10 comprises a compressor 28. The compressor 28 is an integral part of the turbocharger arrangement 26. The compressor 28 may be a conventional compressor used in an ICE system of a heavy-duty vehicle. The compressor 28 is disposed in the inlet manifold 23. Hence, in this example, the inlet manifold 23 extends between the compressor 28 and the ICE 20. The compressor 28 is also configured to be in fluid communication with the air duct 41, as illustrated in FIG. 1.

The compressor 28 is mechanically connected to the turbine 27. As depicted in FIG. 1, the compressor 28 is configured to be connected to the turbine 27 via a shaft 29. Hence, the turbocharger arrangement 26 here also comprises the shaft 29 mechanically connecting the turbine 27 to the compressor 28.

Optionally, the ICE system 10 may comprise a charge air cooler (not illustrated) disposed in the inlet manifold 23. The charge air cooler is e.g. located between the compressor 28 and the ICE 21, as seen in a direction of flow from the compressor 28 to the ICE 20.

The ICE system 10 further comprises a controllable backpressure valve 25. The controllable backpressure valve 25 is located in the exhaust gas conduit 24. The controllable backpressure valve 25 is configured to control the pressure within the exhaust gas conduit 24. The controllable backpressure valve 25 is e.g. a throttle arrangement. The controllable backpressure valve 25 is also arranged between the ICE 20 and the turbine 27, as seen in a direction of flow from the ICE 20 to the turbine 27. More specifically, the controllable backpressure valve 25 is arranged between the cylinder 21 and the turbine wheel, as seen in a direction of flow from the cylinder 21 to the turbine wheel.

As such, the controllable backpressure valve 25 is arranged and configured to be in fluid communication with the cylinder(s) 21 of the ICE 20 and also in fluid communication with the turbine 27.

The controllable backpressure valve 25 is typically also adapted to assume a plurality of different conditions for throttling exhaust gas from the cylinder 21 to the turbine 27. The plurality of different conditions comprising an open condition with a smallest throttling of the exhaust gas amongst the conditions as well as an at least partially closed condition associated with a throttling being larger than the smallest throttling.

The controllable backpressure valve 25 can be opened or closed to control the flow of exhaust gases. When the controllable backpressure valve 25 is closed, it restricts the flow of exhaust gases, increasing backpressure. When the controllable backpressure valve is open, it allows exhaust gases to flow more freely, reducing backpressure.

The controllable backpressure valve 25 is thus a type of exhaust throttle valve and may also be referred to as a pre-turbine throttle due to its location before the turbine of the turbocharger arrangement.

As such, by way of example, the controllable backpressure valve 25 is a so-called pre-turbine throttle 25. A pre-turbine throttle may comprise one or more pivotable flap 25A, as illustrated in FIG. 1. The pivotable flap 25A may be a continuously pivotable flap, which is pivotable between the open condition and an end condition, preferably the end condition resulting in that the portion of the valve is fully closed. In other examples, the pre-turbine throttle is a two-flap device controlled by the same shaft. A two-flap design of the pre-turbine throttle may typically also be pivotable in a similar manner. These types of turbine throttles are commonly known in the art, and thus not further described herein.

Further, as depicted in FIG. 1, the ICE system 10 comprises a control system 90. The control system 90 is configured to be in communication with the controllable backpressure valve 25.

The control system 90 may be configured to control the controllable backpressure valve 25 based on a target gas mass flow of exhaust gas passing the controllable backpressure valve 25. The control system 90 may be adapted to use load information indicative of a current load of the ICE 20 for determining the target gas mass flow information. The control system 90 may also be adapted to use exhaust temperature information indicative of a temperature of the exhaust gas from the cylinder for determining the target gas mass flow information.

The control system 90 comprises processing circuitry 92. In FIG. 1, the control system 90 also comprises a memory 94 and a system bus 96. The control system 90 is here a computer system. These components and further optional technical details of the control system 90 provided in the form of a computer system are described in relation to FIG. 4.

Figure 5:
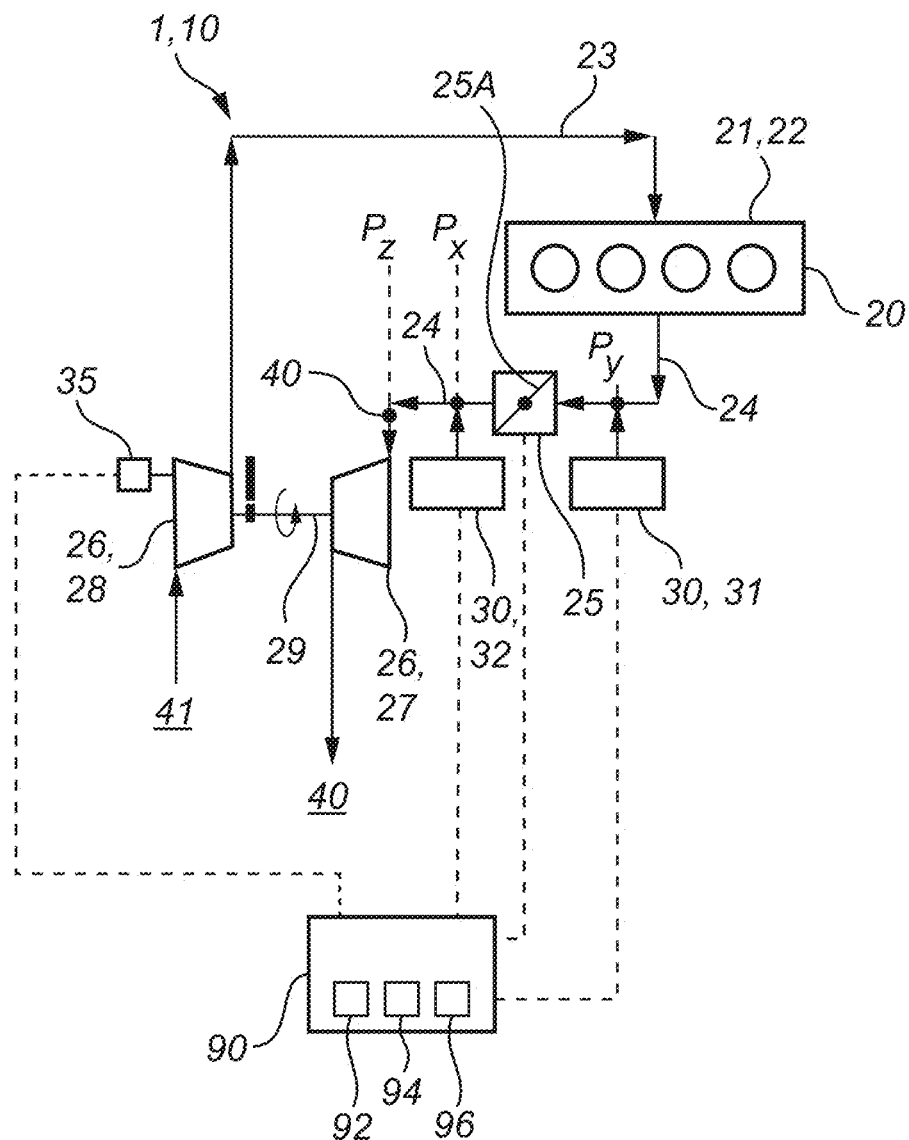
FIG. 5 schematically illustrates an exemplary view of a vehicle comprising an internal combustion engine system according to an example.

Moreover, as illustrated in FIG. 1, the ICE system 10 comprises a pressure sensor arrangement 30. The pressure sensor arrangement 30 comprises at least one pressure sensor 32. In FIG. 1, the ICE system 10 thus comprises a pressure sensor 32. By way of example, the ICE system 10 comprises a pressure sensor 32 disposed in the exhaust gas conduit 24. The pressure sensor 32 is disposed in the exhaust gas conduit 24 in-between the controllable backpressure valve 25 and the turbine 27. In another example, as illustrated in FIG. 5, the ICE system 10 comprises two pressure sensors 31, 32. Accordingly, the pressure sensor arrangement 30 comprises one or more pressure sensors 31, 32.

The pressure sensor 32 is configured to measure an exhaust gas pressure $P_X$ downstream the controllable backpressure valve 25. The pressure sensor 32 is configured to monitor and measure the pressure of the exhaust gases. This pressure reading is generally used as input data for controlling the controllable backpressure valve 25. By way of example, the controllable backpressure valve 25 is controlled by the processing circuitry 92 in response to the measured pressure level by the pressure sensor 32. The controllable backpressure valve 25 is controlled in order to throttle the gas flow to produce backpressure, such that an engine braking effect is produced. The pressure sensor 32 can be provided in several different ways and is a common component of an ICE system of a heavy-duty vehicle.

The pressure sensor 32 is arranged in communication with the processing circuitry 92 of the control system 90. The control system 90 is thus configured to determine an exhaust gas pressure using the pressure sensor 32.

The control system 90 is also configured to determine an operational status of the pressure sensor 32, as further described herein.

In addition, in FIG. 1, the ICE system 10 comprises a speed sensor 35 configured to measure a compressor speed. The speed sensor 35 can be provided in several different ways and is also a common component of an ICE system of a heavy-duty vehicle. The speed sensor 35 is arranged in communication with the processing circuitry 92 of the control system 90. The control system 90 is thus configured to determine a speed of the compressor.

Figure 2:
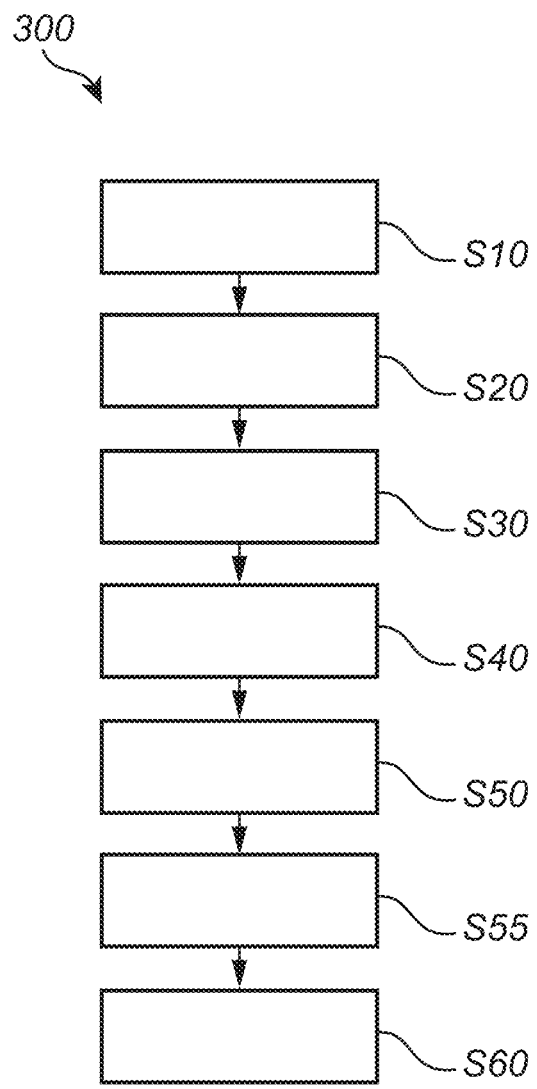
FIG. 2 is a flow-chart of an exemplary method according to an example.

Turning now to the operations of the control system 90. The operations of the control system 90 will now further be described in relation to FIG. 1, in combination with FIG. 2. FIG. 2 schematically illustrates a flow-chart of the operations of the control system 90, according to an example. More specifically FIG. 2 is an exemplary computer implemented method 300 according to an example.

The processing circuitry 92 of the control system 90 is configured to receive speed data from the speed sensor 35 so as to determine a compressor speed. In this context, the compressor speed refers to the revolution of the shaft 29 between the turbine 27 and the compressor 28.

The monitored compressor speed is transferred to the processing circuitry 92. Accordingly, the processing circuitry 92 is configured to obtain real-time compressor speed data from the speed sensor 25.

The processing circuitry 92 of the control system 90 is configured to determine a pressure ratio over the compressor 28.

The pressure ratio over the compressor 28 can be determined in several different manners. In general, the pressure ratio over the compressor 28 is derivable from the energy balance over the turbocharger arrangement 26, which can be defined by considering the energy flow through the turbine 27 and the compressor 28). The purpose of the turbocharger arrangement 26 is to utilize exhaust gas energy to drive the compressor, which, in turn, compresses the intake air to improve engine performance. The energy balance over the turbocharger arrangement generally includes two stages: turbine stage and compressor stage. In the turbine stage, the turbine extracts energy from the high-temperature, high-pressure exhaust gases coming from the engine. The kinetic and thermal energy of the exhaust gases is converted into mechanical energy to drive the turbine. The mechanical energy produced by the turbine 27 is transmitted to the shaft 29 connecting the turbine 27 and compressor 28. In the compressor stage, the shaft 29 work from the turbine 27 is the input energy for the compressor 28. This mechanical energy is used to drive the compressor, which compresses the intake air. The compressor increases the energy of the intake air by compressing it. The compressed air is then delivered to the engine 20, where it enhances combustion and improves overall engine performance.

The pressure ratio across the compressor 28 is thus influenced by the performance of both the compressor 28 and the turbine 27. The pressure ratio, PR, over the compressor 28 is defined as the ratio of the compressor outlet pressure to the compressor inlet pressure.

Accordingly, the processing circuitry 92 is configured to determine the pressure ratio across the compressor 28.

The processing circuitry 92 of the control system 90 is also configured to determine a pressure drop over the compressor 28 based on the determined compressor speed and the determined pressure ratio over the compressor 28.

Determining the pressure drop over the compressor 28 based on the pressure ratio and compressor speed can e.g. be derivable from its performance map. The compressor speed is usually expressed as the rotational speed in revolutions per minute (RPM). Compressor maps are graphical representations that show the performance characteristics of a compressor under various operating conditions. These maps typically include contours of pressure ratio, mass flow rate, and efficiency. The compressor map can be provided by the manufacturer of the compressor 28.

Determining the pressure drop based on determined pressure ratio and compressor speed may thus include the operations of obtaining a compressor map by acquiring the compressor map from the manufacturer or supplier. Such map indicates the compressor's performance characteristics, including pressure ratio, mass flow rate, and efficiency at different operating points. From the compressor map, the processing circuitry 92 identifies the operating point on the compressor map based on the pressure ratio and compressor speed. The pressure ratio will indicate the desired outlet pressure relative to the inlet pressure, and the compressor speed will help locate the appropriate contour on the map. Once the operating point is identified, the processing circuitry 92 reads the corresponding mass flow rate from the compressor map. This value represents the flow rate of air through the compressor at the specified pressure ratio and speed. Next, the processing circuitry 92 calculates the pressure drop across the compressor by e.g. using the following relationship:

Pressure drop=Mass Flow Rate÷Compressor Speed

It should be noted that this relationship is a simplified form that assumes a linear relationship between mass flow rate and pressure drop. It thus provides a rough estimate and may not account for all compressor characteristics.

The processing circuitry 92 of the control system 90 is also configured to determine a first reference exhaust gas pressure $P_Z$ at a position 40 in-between the controllable backpressure valve 25 and the turbine 27 based on the determined pressure drop over the compressor 28. The position 40 is located in the exhaust gas flow of the exhaust gas conduit 24.

Accordingly, as described above, the compressor speed value and the pressure ratio over the compressor 28 are used as input data to calculate the pressure after the backpressure valve 25, i.e. the first reference exhaust gas pressure $P_Z$ at the position 40.

By using the compressor speed to determine the exhaust gas pressure downstream the controllable backpressure valve 25, there is generally no need for receiving information about the position of the controllable backpressure valve 25 in order to determine the exhaust gas pressure.

The processing circuitry 92 of the control system 90 is also configured to determine a second reference exhaust gas pressure $P_X$ using the pressure sensor 32.

The processing circuitry 92 of the control system 90 is also configured to compare the determined first reference exhaust gas pressure $P_Z$ with the determined second reference exhaust gas pressure $P_X$.

Then, the processing circuitry 92 of the control system 90 is configured to determine that the pressure sensor 32 is operational based on the comparison.

In other words, the processing circuitry 92 is configured to determine that the pressure sensor 32 is operational by comparing the determined first reference exhaust gas pressure $P_Z$ with the determined second reference exhaust gas pressure $P_X$.

More specifically, the pressure sensor 32 is determined to be operational if the determined second reference exhaust gas pressure $P_X$ equals the determined first reference exhaust gas pressure $P_Z$.

Moreover, the pressure sensor 32 is determined to be non-operational if the determined second reference exhaust gas pressure $P_X$ is different than the determined first reference exhaust gas pressure $P_Z$.

As such, the processing circuitry 92 is further configured to determine that the pressure sensor 32 is operational if the determined second reference exhaust gas pressure $P_X$ equals the determined first reference exhaust gas pressure $P_Z$.

In addition, or alternatively, the processing circuitry 92 is configured to determine that the pressure sensor 32 is non-operational if the determined second reference exhaust gas pressure $P_X$ is different than the determined first reference exhaust gas pressure $P_Z$.

To sum up, the power needed in the compressor 28, to compress the air, is transported from the turbine 27 via the rotating shaft 29. By determining the compressor speed (shaft speed) and the pressure ratio over the compressor 28, it becomes possible to calculate the pressure drop over the compressor 28 and therefore the first reference exhaust gas pressure $P_Z$ at the position 40 after the backpressure valve 25. The processing circuitry 92 then uses the estimation of the first reference exhaust gas pressure $P_Z$ to compare it with a measured value (second reference exhaust gas pressure, $P_X$) to detect a broken pressure sensor.

As such, by the above operations of the processing circuitry 92, there is typically no need for receiving feedback information about the position/operation of the controllable backpressure valve 25 in order to determine the exhaust gas pressure and/or diagnose the pressure sensor 32. Accordingly, it becomes possible to diagnose the pressure sensor 32 during the activation of the engine brake operation or when the ICE is in operating in the heat mode. Therefore, an error of the pressure sensor 32 can be detected during an engine operation when a potential error of the pressure reading may have the most negative impact on the control of the ICE system 10, i.e. when the pressure sensor 32 is used for controlling the controllable backpressure valve 25 and exhaust pressure, and thus also for controlling the engine brake operation.

For completeness, although not illustrated in FIG. 1, it should be readily appreciated that the ICE system 10 of FIG. 1 may optionally comprise an additional pressure sensor. An example of the arrangement of the additional pressure sensor is described herein in relation to FIG. 5. The additional pressure sensor 31 (as shown in FIG. 5) can be provided in several different ways and is also a common component of an ICE system of a heavy-duty vehicle. The additional pressure sensor 31 is also arranged in communication with the processing circuitry 92 of the control system 90. The control system 90 is thus configured to determine an exhaust gas pressure using the pressure sensor 31. The control system 90 is also configured to determine an operational status of the additional pressure sensor 31, as further described herein in relation to FIG. 5.

For ease of reference, the pressure sensor 32 is a first pressure sensor and the other (additional) pressure sensor 31 is a second pressure sensor. The first and second pressure sensors 31, 32 are here parts of the pressure sensor arrangement 30.

As such, the ICE system 10 here further comprises the second pressure sensor 31 (as shown in FIG. 5). The second pressure sensor 31 is disposed in the exhaust gas conduit 24 in-between the ICE 20 and the controllable backpressure valve 25. The second pressure sensor 31 is configured to measure an exhaust gas pressure upstream the controllable backpressure valve 25. The exhaust gas pressure using the second pressure sensor 31 is denoted as the third reference exhaust gas pressure $P_Y$.

The second pressure sensor 31 is also configured to monitor and measure the pressure of the exhaust gases. This pressure reading is generally also used as input data for controlling the controllable backpressure valve 25. Hence, by way of example, the controllable backpressure valve 25 is here also controlled by the processing circuitry 92 in response to the measured pressure level by the first pressure sensor 32 and the second pressure sensor 31. An ICE system 10 using two pressure sensors provides for an even more accurate and smooth control of the controllable backpressure valve 25. As mentioned herein, the controllable backpressure valve 25 is controlled in order to throttle the gas flow to produce backpressure, such that an engine braking effect is produced.

Moreover, the processing circuitry 92 is here configured to control the controllable backpressure valve 25 to an open state. This operation is performed to permit that the processing circuitry 92 can determine the status of the second pressure sensor 31. By opening the controllable backpressure valve 25 to the open state, the first pressure sensor 32 arranged downstream the controllable backpressure valve 25 and the second pressure sensor 31 arranged upstream the controllable backpressure valve 25 will measure the same pressure of the exhaust gas. This is possible only when the controllable backpressure valve 25 is open, because at that state of the controllable backpressure valve 25, the exhaust gas pressure $P_X$ and the exhaust gas pressure $P_Y$ are the same. This means that the processing circuitry 92 may also be able to diagnose the second pressure sensor 31.

In addition, the processing circuitry 92 is configured to determine that the second pressure sensor 31 is operational by comparing the determined first reference exhaust gas pressure with a measured exhaust gas pressure $P_Y$ (see FIG. 5) using the second pressure sensor 31.

For the sake of clarification, the exhaust gas pressure $P_Y$ using the second pressure sensor 31 is determined when the controllable backpressure valve 25 is in the open state.

By way of example, the second pressure sensor 31 is determined to be operational if the measured exhaust gas pressure, using the second pressure sensor 31, i.e. the third reference exhaust gas pressure $P_Y$, equals the determined first reference exhaust gas pressure $P_Z$.

In addition, or alternatively, the second pressure sensor 31 is determined to be non-operational if the measured exhaust gas pressure using the second pressure sensor 31, i.e. the third reference exhaust gas pressure $P_Y$ is different than the determined first reference exhaust gas pressure $P_Z$. In other words, the second pressure sensor 31 is determined to be non-operational if the determined first reference exhaust gas pressure $P_Z$ is different to the measured exhaust gas pressure using the second pressure sensor 31, i.e. the third reference exhaust gas pressure $P_Y$.

It should be readily appreciated that the processing circuitry 92 is configured to be in communication with any one of the backpressure valve 25, the first pressure sensor 32, the second pressure sensor 31, and the speed sensor 35.

The processing circuitry 92 can determine the operational status of the pressure sensors 30, 31, 32 at several different situations.

By way of example, the processing circuitry 92 is configured to determine the operational status of the first pressure sensor 32 during an engine braking operation of the ICE system 10.

By way of example, the processing circuitry 92 is configured to determine the operational status of the second pressure sensor 31 during the engine braking operation of the ICE system 10.

By way of example, the processing circuitry 92 is configured to determine the operational status of the first pressure sensor 32 during a heat mode operation of the ICE system 10.

By way of example, the processing circuitry 92 is configured to determine the operational status of the second pressure sensor 32 during the heat mode operation of the ICE system 10.

For completeness, there is also disclosed a vehicle 1 comprising the ICE system 10 according to the above, and as illustrated in FIG. 1.

FIG. 2 is a flow chart of a method according to an example. More specifically FIG. 2 is an exemplary computer implemented method 300 according to an example. The computer-implemented method 300 is intended for determining an operational status of at least one pressure sensor of the pressure sensors 31, 32 in FIG. 1. The method 300 is generally implemented by the processing circuitry 92.

As illustrated in FIG. 2, the computer-implemented method 300 comprises a step of receiving S10, by the processing circuitry 92, speed data from the speed sensor 35 so as to determine the compressor speed.

Further, the computer-implemented method 300 comprises a step of determining S20, by the processing circuitry 92, a pressure ratio over the compressor 28.

Next, the computer-implemented method 300 comprises a step of determining S30, by the processing circuitry 92, a pressure drop over the compressor based on the determined compressor speed and the determined pressure ratio over the compressor 28.

Then, the computer-implemented method 300 comprises a step of determining S40, by the processing circuitry 92, the first reference exhaust gas pressure at the position 40 in-between the controllable backpressure valve 25 and the turbine 27 based on the determined pressure drop over the compressor 28.

Moreover, the computer-implemented method 300 comprises a step of determining S50, by the processing circuitry 92, the second reference exhaust gas pressure using the pressure sensor 32.

Subsequently, the computer-implemented method 300 comprises a step of comparing S55, by the processing circuitry 92, the determined first reference exhaust gas pressure with the determined second reference exhaust gas pressure.

Finally, the computer-implemented method 300 comprises a step of determining S60, by the processing circuitry 92, that the pressure sensor 32 is operational based on the comparison.

Figure 3:
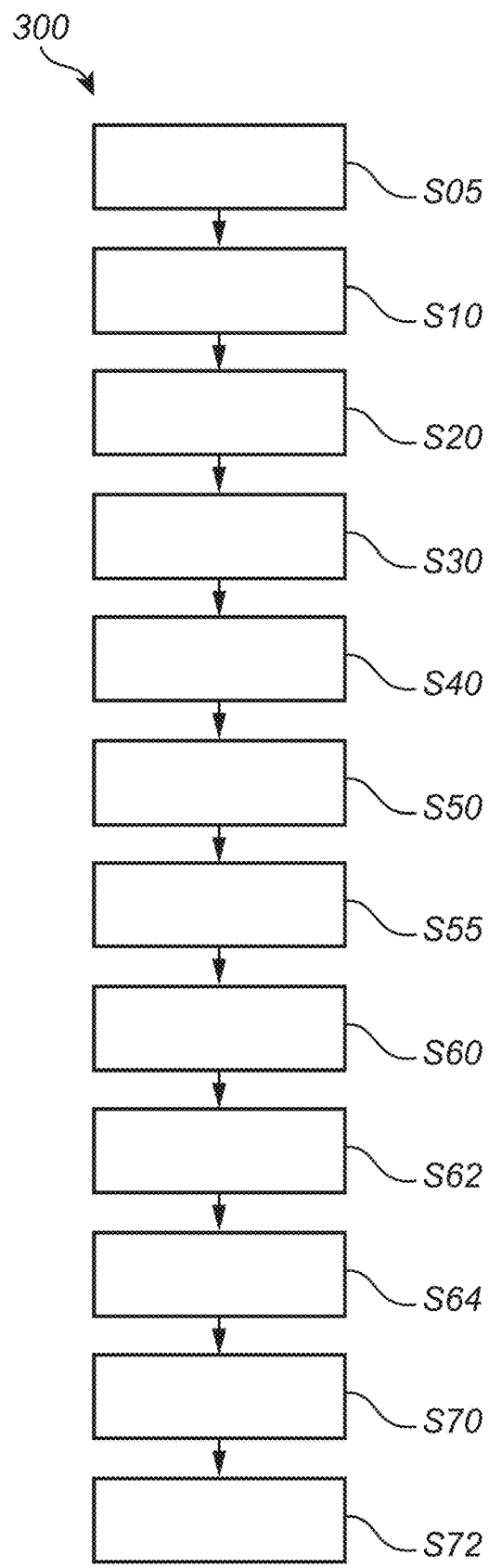
FIG. 3 is another flow-chart of an exemplary method according to an example.

FIG. 3 is a flow chart of an extended example of a method according to an example. More specifically FIG. 3 is an exemplary computer implemented method 300 according to an example. The computer-implemented method 300 in FIG. 3 is also intended for determining an operational status of at least one pressure sensor of the pressure sensors 31, 32 in FIG. 1. The method 300 is generally implemented by the processing circuitry 92.

Moreover, in this example, the pressure sensor 32 is the first pressure sensor, and the ICE system 10 further comprises the second pressure sensor 31 disposed in the exhaust gas conduit 24 in-between the ICE 20 and the controllable backpressure valve 25, see e.g. FIG. 5. The second pressure sensor 31 is configured to measure an exhaust gas pressure upstream the controllable backpressure valve 25.

In this example, the computer-implemented method 300 comprises an initial step of controlling S05, by the processing circuitry 92, the controllable backpressure valve 25 to the open state. This operation is performed to permit that the processing circuitry 92 can determine the status of the second pressure sensor 31. By opening the controllable backpressure valve 25 to the open state, the first pressure sensor 32 arranged downstream the controllable backpressure valve 25 and the second pressure sensor 31 arranged upstream the controllable backpressure valve 25 will measure the same pressure of the exhaust gas. This is possible only when the controllable backpressure valve 25 is open, because at that state of the controllable backpressure valve 25, the exhaust gas pressure $P_X$ and the exhaust gas pressure $P_Y$ are the same. This means that the method 30 and the processing circuitry 92 may also be able to diagnose the second pressure sensor 31.

Moreover, the method of FIG. 3 comprises the steps S10 to S60, as mentioned in relation to method of FIG. 2. In other words, as illustrated in FIG. 3, the computer-implemented method 300 comprises the step of receiving S10, by the processing circuitry 92, speed data from the speed sensor 35 so as to determine the compressor speed. Further, the computer-implemented method 300 comprises the step of determining S20, by the processing circuitry 92, a pressure ratio over the compressor 28. Next, the computer-implemented method 300 comprises the step of determining S30, by the processing circuitry 92, a pressure drop over the compressor 28 based on the determined compressor speed and the determined pressure ratio over the compressor 28. Then, the computer-implemented method 300 comprises the step of determining S40, by the processing circuitry 92, a first reference exhaust gas pressure at a position 40 in-between the controllable backpressure valve 25 and the turbine 27 based on the determined pressure drop over the compressor 28. Moreover, the computer-implemented method 300 comprises the step of determining S50, by the processing circuitry 92, a second reference exhaust gas pressure using the first pressure sensor 30, 32. Subsequently, the computer-implemented method 300 comprises the step of comparing S55, by the processing circuitry 92, the determined first reference exhaust gas pressure with the determined second reference exhaust gas pressure. Also, the computer-implemented method 300 comprises a step of determining S60, by the processing circuitry 92, that the pressure sensor 32 is operational based on the comparison.

Next, the computer-implemented method 300 comprises a step of determining S62 that the pressure sensor 32, is operational if the determined second reference exhaust gas pressure equals the determined first reference exhaust gas pressure.

Alternatively, or in addition, the computer-implemented method 300 comprises a step of determining S64 that the first pressure sensor 32 is non-operational if the determined second reference exhaust gas pressure is different than the determined first reference exhaust gas pressure. By way of example, the method 300 determines S64 that the first pressure sensor 32 is non-operational if the determined second reference exhaust gas pressure is lower than the determined first reference exhaust gas pressure. Alternatively, the method 300 determines S64 that the first pressure sensor 32 is non-operational if the determined second reference exhaust gas pressure is higher than the determined first reference exhaust gas pressure.

Next, the computer-implemented method 300 comprises a step of determining S70 that the second pressure sensor 31 is operational by comparing S72 the determined first reference exhaust gas pressure with a measured exhaust gas pressure using the second pressure sensor 31. As such, the exhaust gas pressure at the position in-between the controllable backpressure valve 25 and the turbine 27 is determined based on the determined pressure drop over the compressor 28.

The method in FIG. 3 may be performed during an engine braking operation of the ICE system 10 and/or during a heat mode operation of the ICE system 10.

It should be noted that the control system 90 may be an integral part of the ICE system 10. In other examples, the control system 90 and the ICE system 10 may be separate parts configured to communicate with each other. The communication may either be by wire or in a wireless fashion, as is commonly known in the art. The control system 90 may also be provided as a computer system 100, which may e.g. be a part of the vehicle 1 or part of a remote server, or the like.

In some examples, there is provided a computer program product comprising program code for performing, when executed by the processing circuitry 92, the method 300 as described above.

In some examples, there is provided a non-transitory computer-readable storage medium comprising instructions, which when executed by the processing circuitry 92, cause the processing circuitry 92 to perform the method 300 as described above.

FIG. 5 schematically illustrates an exemplary view of a vehicle 1 comprising an ICE system 10 according to an example, in which the ICE system 10 may comprises the components and features of FIG. 1 except that the ICE system 10 has a pressure sensor arrangement 30 with one single pressure sensor 31. Accordingly, in FIG. 5, the ICE system 10 comprises the controllable backpressure valve 25 being located in the exhaust gas conduit 24. The exhaust gas conduit 24 extends between the ICE 20 and the turbine 27 of the turbocharger arrangement 26. The controllable backpressure valve 25 is further configured to control the pressure within the exhaust gas conduit 24. Moreover, the ICE system 10 comprises the compressor 28. The compressor 28 is disposed in the inlet manifold 23. The inlet manifold 23 extends between the compressor 28 and the ICE 20. The compressor 28 is connected to the turbine 27 via the shaft 29. In addition, the pressure sensor 32 is disposed in the exhaust gas conduit 24 in-between the controllable backpressure valve 25 and the turbine 27. Also, the pressure sensor 32 is configured to measure an exhaust gas pressure downstream the controllable backpressure valve 25. Also, the speed sensor 35 is configured to measure a compressor speed. Finally, the control system 90 is configured to determine an operational status of the pressure sensor 32. The control system 90 comprises processing circuitry 92 configured to receive speed data from the speed sensor so as to determine a compressor speed; determine a pressure ratio over the compressor 28; determine a pressure drop over the compressor 28 based on the determined compressor speed and the determined pressure ratio over the compressor 28; determine a first reference exhaust gas pressure at the position 40 in-between the controllable backpressure valve 25 and the turbine 27 based on the determined pressure drop over the compressor 28; determine a second reference exhaust gas pressure using the pressure sensor 32; compare the determined first reference exhaust gas pressure with the determined second reference exhaust gas pressure; and determine that the pressure sensor 32 is operational based on the comparison.

Further details of one example of a computer system that can be used as the control system 90 will now be described in relation to FIG. 4.

Figure 4:
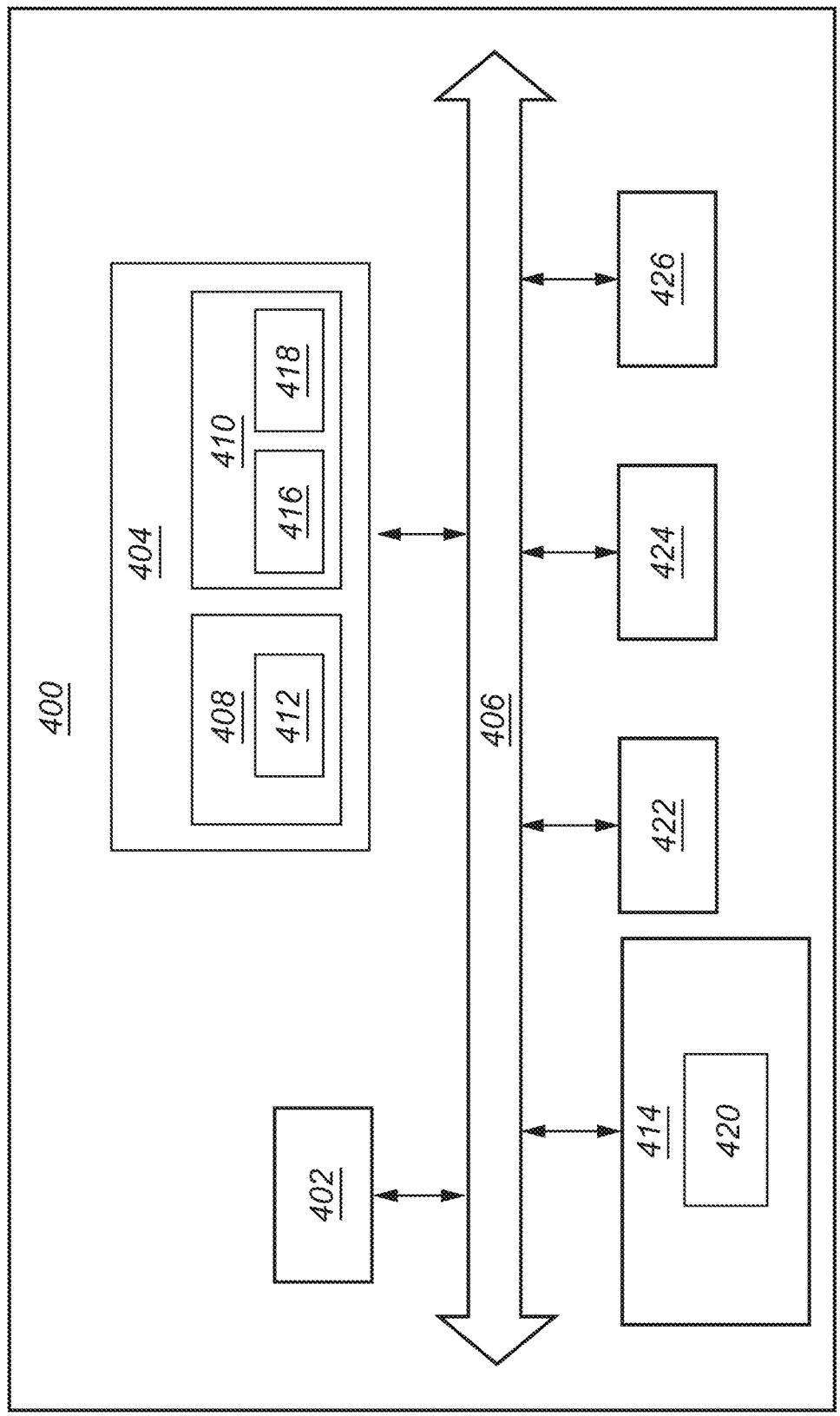
FIG. 4 is a schematic diagram of an exemplary computer system for implementing examples disclosed herein, according to an example.

FIG. 4 is a schematic diagram of a computer system 400 for implementing examples disclosed herein. The computer system 400 is adapted to execute instructions from a computer-readable medium to perform these and/or any of the functions or processing described herein. The computer system 400 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 400 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 400 may comprise at least one computing device or electronic device capable of including firmware, hardware, and/or executing software instructions to implement the functionality described herein. The computer system 400 may include processing circuitry 402 (e.g., processing circuitry including one or more processor devices or control units), a memory 404, and a system bus 406. The computer system 400 may include at least one computing device having the processing circuitry 402. The system bus 406 provides an interface for system components including, but not limited to, the memory 404 and the processing circuitry 402. The processing circuitry 402 may include any number of hardware components for conducting data or signal processing or for executing computer code stored in memory 404. The processing circuitry 402 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 402 may further include computer executable code that controls operation of the programmable device.

The system bus 406 may be any of several types of bus structures that may further interconnect to a memory bus (with or without a memory controller), a peripheral bus, and/or a local bus using any of a variety of bus architectures. The memory 404 may be one or more devices for storing data and/or computer code for completing or facilitating methods described herein. The memory 404 may include database components, object code components, script components, or other types of information structure for supporting the various activities herein. Any distributed or local memory device may be utilized with the systems and methods of this description. The memory 404 may be communicably connected to the processing circuitry 402 (e.g., via a circuit or any other wired, wireless, or network connection) and may include computer code for executing one or more processes described herein. The memory 404 may include non-volatile memory 408 (e.g., read-only memory (ROM), erasable programmable read-only memory (EPROM), electrically erasable programmable read-only memory (EEPROM), etc.), and volatile memory 410 (e.g., random-access memory (RAM)), or any other medium which can be used to carry or store desired program code in the form of machine-executable instructions or data structures and which can be accessed by a computer or other machine with processing circuitry 402. A basic input/output system (BIOS) 412 may be stored in the non-volatile memory 408 and can include the basic routines that help to transfer information between elements within the computer system 400.

The computer system 400 may further include or be coupled to a non-transitory computer-readable storage medium such as the storage device 414, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 414 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 414 and/or in the volatile memory 410, which may include an operating system 416 and/or one or more program modules 418. All or a portion of the examples disclosed herein may be implemented as a computer program 420 stored on a transitory or non-transitory computer-usable or computer-readable storage medium (e.g., single medium or multiple media), such as the storage device 414, which includes complex programming instructions (e.g., complex computer-readable program code) to cause the processing circuitry 402 to carry out actions described herein. Thus, the computer-readable program code of the computer program 420 can comprise software instructions for implementing the functionality of the examples described herein when executed by the processing circuitry 402. In some examples, the storage device 414 may be a computer program product (e.g., readable storage medium) storing the computer program 420 thereon, where at least a portion of a computer program 420 may be loadable (e.g., into a processor) for implementing the functionality of the examples described herein when executed by the processing circuitry 402. The processing circuitry 402 may serve as a controller or control system for the computer system 400 that is to implement the functionality described herein.

The computer system 400 may include an input device interface 422 configured to receive input and selections to be communicated to the computer system 400 when executing instructions, such as from a keyboard, mouse, touch-sensitive surface, etc. Such input devices may be connected to the processing circuitry 402 through the input device interface 422 coupled to the system bus 406 but can be connected through other interfaces, such as a parallel port, an Institute of Electrical and Electronic Engineers (IEEE) 1394 serial port, a Universal Serial Bus (USB) port, an IR interface, and the like. The computer system 400 may include an output device interface 424 configured to forward output, such as to a display, a video display unit (e.g., a liquid crystal display (LCD) or a cathode ray tube (CRT)). The computer system 400 may include a communications interface 426 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Moreover, the present disclosure may be exemplified by any one of the below examples.

Example 1: An internal combustion engine (ICE) system 10 comprising: an internal combustion engine 20; a turbocharger arrangement 26, the turbocharger arrangement 26 having a turbine 27 arranged in an exhaust gas conduit 24, the exhaust gas conduit extending between the internal combustion engine 20) and the turbine 27), and further a compressor 28) disposed in an inlet manifold 23), the inlet manifold extending between the compressor and the internal combustion engine, the compressor being configured to be connected to the turbine via a shaft 29); a controllable backpressure valve 25) being located in the exhaust gas conduit, the controllable backpressure valve being configured to control the pressure within the exhaust gas conduit; a pressure sensor 30, 32) disposed in the exhaust gas conduit, and further in-between the controllable backpressure valve and the turbine, the pressure sensor being configured to measure an exhaust gas pressure downstream the controllable backpressure valve; a speed sensor 35 configured to measure a compressor speed; a control system 90 for determining an operational status of the pressure sensor, wherein the control system comprises processing circuitry 92 configured to: receive speed data from the speed sensor so as to determine a compressor speed; determine a pressure ratio over the compressor; determine a pressure drop over the compressor based on the determined compressor speed and the determined pressure ratio over the compressor; determine a first reference exhaust gas pressure at a position 40 in-between the controllable backpressure valve and the turbine based on the determined pressure drop over the compressor; determine a second reference exhaust gas pressure using the pressure sensor; compare the determined first reference exhaust gas pressure with the determined second reference exhaust gas pressure; and determine that the pressure sensor is operational based on the comparison.

Example 2: The ICE system of example 1, wherein the processing circuitry is further configured to determine that the pressure sensor is operational if the determined second reference exhaust gas pressure equals the determined first reference exhaust gas pressure.

Example 3: The ICE system of example 2 or example 3, the processing circuitry is further configured to determine that the pressure sensor is non-operational if the determined second reference exhaust gas pressure is different than the determined first reference exhaust gas pressure.

Example 4: The ICE system of examples 1 to 3, wherein the pressure sensor is a first pressure sensor, and the ICE system further comprises a second pressure sensor 30, 31 disposed in the exhaust gas conduit in-between the ICE and the controllable backpressure valve, the second pressure sensor being configured to measure an exhaust gas pressure upstream the controllable backpressure valve, and wherein the processing circuitry is further configured to control the controllable backpressure valve to an open state; and determine that the second pressure sensor is operational by comparing the determined first reference exhaust gas pressure with a measured exhaust gas pressure using the second pressure sensor.

Example 5: The ICE system of any of examples 1 to 4, wherein the processing circuitry is further configured to determine the operational status of the pressure sensor during an engine braking operation of the internal combustion engine system.

Example 6: The ICE system of any of examples 1 to 4, wherein the processing circuitry is further configured to determine the operational status of the pressure sensor during a heat mode operation of the internal combustion engine system.

Example 7: A vehicle comprising an internal combustion engine system of any one of the preceding examples 1 to 6.

Example 8: A method 100 of determining an operational status of a pressure sensor 30, 31, 32 disposed in an exhaust gas conduit 24 of an internal combustion engine system 10, the internal combustion engine system comprising: a controllable backpressure valve 25 being located in the exhaust gas conduit, the exhaust gas conduit extending between an internal combustion engine 20 and a turbine 27 of a turbocharger arrangement 26, the controllable backpressure valve being configured to control the pressure within the exhaust gas conduit; a compressor 28 disposed in an inlet manifold 23, the inlet manifold extending between the compressor and the internal combustion engine, the compressor being configured to be connected to the turbine via a shaft; a pressure sensor 30, 32 disposed in the exhaust gas conduit in-between the controllable backpressure valve and the turbine, the pressure sensor being configured to measure an exhaust gas pressure downstream the controllable backpressure valve; a speed sensor 35 configured to measure a compressor speed; wherein the method comprises: receiving S10 speed data from the speed sensor so as to determine a compressor speed; determining S20 a pressure ratio over the compressor; determining S30 a pressure drop over the compressor based on the determined compressor speed and the determined pressure ratio over the compressor; determining S40 a first reference exhaust gas pressure at a position 40 in-between the controllable backpressure valve and the turbine based on the determined pressure drop over the compressor; determining S50 a second reference exhaust gas pressure using the pressure sensor; comparing S55 the determined first reference exhaust gas pressure with the determined second reference exhaust gas pressure; and determining S60 that the pressure sensor is operational based on the comparison.

Example 9: Method according to example 8, further comprising determining S62 that the pressure sensor is operational if the determined second reference exhaust gas pressure equals the determined first reference exhaust gas pressure.

Example 10: Method according to example 8 or example 9, further comprising determining S64 that the pressure sensor is non-operational if the determined second reference exhaust gas pressure is different than the determined first reference exhaust gas pressure.

Example 11: Method according to any one of the previous examples 8 to 10, wherein the pressure sensor is a first pressure sensor, and the ICE system further comprises a second pressure sensor 30, 31 disposed in the exhaust gas conduit in-between the internal combustion engine and the controllable backpressure valve, the second pressure sensor being configured to measure an exhaust gas pressure upstream the controllable backpressure valve, and wherein the method further comprises: controlling S05 the controllable backpressure valve to an open state; and determining S70 that the second pressure sensor is operational by comparing S72 the determined first reference exhaust gas pressure with a measured exhaust gas pressure using the second pressure sensor.

Example 12: Method according to any one of the previous examples 8 to 11, wherein the method is performed during an engine braking operation of the internal combustion engine system.

Examples 13: Method according to any one of the previous examples 8 to 12, wherein the method is performed during a heat mode operation of the internal combustion engine system.

Examples 14: A computer program product comprising program code for performing, when executed by the processing circuitry of any of examples 1 to 6, the method of examples 8 to 13.

Examples 15: A non-transitory computer-readable storage medium comprising instructions, which when executed by the processing circuitry of any of examples 1 to 6, cause the processing circuitry to perform the method of examples 8 to 13.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. An internal combustion engine (ICE) system comprising:
   an internal combustion engine;
   a turbocharger arrangement, the turbocharger arrangement having a turbine arranged in an exhaust gas conduit, the exhaust gas conduit extending between the internal combustion engine and the turbine, and further a compressor disposed in an inlet manifold, the inlet manifold extending between the compressor and the internal combustion engine, the compressor being configured to be connected to the turbine via a shaft;
   a controllable backpressure valve being located in the exhaust gas conduit, the controllable backpressure valve being configured to control the pressure within the exhaust gas conduit;
   a pressure sensor disposed in the exhaust gas conduit, and further in-between the controllable backpressure valve and the turbine, the pressure sensor being configured to measure an exhaust gas pressure downstream the controllable backpressure valve;
   a speed sensor configured to measure a compressor speed; and
   a control system for determining an operational status of the pressure sensor, wherein the control system comprises processing circuitry configured to:
      receive speed data from the speed sensor so as to determine a compressor speed;
      determine a pressure ratio over the compressor;
      determine a pressure drop over the compressor based on the determined compressor speed and the determined pressure ratio over the compressor;
      determine a first reference exhaust gas pressure at a position in-between the controllable backpressure valve and the turbine based on the determined pressure drop over the compressor;
      determine a second reference exhaust gas pressure using the pressure sensor;
      compare the determined first reference exhaust gas pressure with the determined second reference exhaust gas pressure; and
      determine that the pressure sensor is operational based on the comparison.

2. The ICE system of claim 1, wherein the processing circuitry is further configured to determine that the pressure sensor is operational if the determined second reference exhaust gas pressure equals the determined first reference exhaust gas pressure.

3. The ICE system of claim 1, wherein the processing circuitry is further configured to determine that the pressure sensor is non-operational if the determined second reference exhaust gas pressure is different than the determined first reference exhaust gas pressure.

4. The ICE system of claim 1, wherein the pressure sensor is a first pressure sensor, and the ICE system further comprises a second pressure sensor disposed in the exhaust gas conduit in-between the ICE and the controllable backpressure valve, the second pressure sensor being configured to measure an exhaust gas pressure upstream the controllable backpressure valve, and wherein the processing circuitry is further configured to control the controllable backpressure valve to an open state; and determine that the second pressure sensor is operational by comparing the determined first reference exhaust gas pressure with a measured exhaust gas pressure using the second pressure sensor.

5. The ICE system of claim 1, wherein the processing circuitry is further configured to determine the operational status of the pressure sensor during an engine braking operation of the internal combustion engine system.

6. The ICE system of claim 1, wherein the processing circuitry is further configured to determine the operational status of the pressure sensor during a heat mode operation of the internal combustion engine system.

7. A vehicle comprising an internal combustion engine system of claim 1.

8. A method of determining an operational status of a pressure sensor disposed in an exhaust gas conduit of an internal combustion engine system, the internal combustion engine system comprising:
- a controllable backpressure valve being located in the exhaust gas conduit, the exhaust gas conduit extending between an internal combustion engine and a turbine of a turbocharger arrangement, the controllable backpressure valve being configured to control the pressure within the exhaust gas conduit;
- a compressor disposed in an inlet manifold, the inlet manifold extending between the compressor and the internal combustion engine, the compressor being configured to be connected to the turbine via a shaft;
- a pressure sensor disposed in the exhaust gas conduit in-between the controllable backpressure valve and the turbine, the pressure sensor being configured to measure an exhaust gas pressure downstream the controllable backpressure valve; and
- a speed sensor configured to measure a compressor speed;

wherein the method comprises:
- receiving speed data from the speed sensor so as to determine a compressor speed;
- determining a pressure ratio over the compressor;
- determining a pressure drop over the compressor based on the determined compressor speed and the determined pressure ratio over the compressor;
- determining a first reference exhaust gas pressure at a position in-between the controllable backpressure valve and the turbine based on the determined pressure drop over the compressor;
- determining a second reference exhaust gas pressure using the pressure sensor;
- comparing the determined first reference exhaust gas pressure with the determined second reference exhaust gas pressure; and
- determining that the pressure sensor is operational based on the comparison.

9. The method according to claim 8, further comprising determining that the pressure sensor is operational if the determined second reference exhaust gas pressure equals the determined first reference exhaust gas pressure.

10. The method according to claim 8, further comprising determining that the pressure sensor is non-operational if the determined second reference exhaust gas pressure is different than the determined first reference exhaust gas pressure.

11. The method according to claim 8, wherein the pressure sensor is a first pressure sensor, and the ICE system further comprises a second pressure sensor disposed in the exhaust gas conduit in-between the internal combustion engine and the controllable backpressure valve, the second pressure sensor being configured to measure an exhaust gas pressure upstream the controllable backpressure valve, and wherein the method further comprises:
- controlling the controllable backpressure valve to an open state; and
- determining that the second pressure sensor is operational by comparing the determined first reference exhaust gas pressure with a measured exhaust gas pressure using the second pressure sensor.

12. The method according to claim 8, wherein the method is performed during an engine braking operation of the internal combustion engine system.

13. The method according to claim 8, wherein the method is performed during a heat mode operation of the internal combustion engine system.

14. A non-transitory computer-readable storage medium storing instructions, which when executed by processing circuitry, cause the processing circuitry to perform the method of claim 8.

* * * * *